(12) United States Patent
Guo

(10) Patent No.: US 11,543,107 B1
(45) Date of Patent: Jan. 3, 2023

(54) INTELLIGENT WEARING DEVICE WITH LED LAMPS

(71) Applicant: Shenzhen Calion Power Co., Ltd, Shenzhen (CN)

(72) Inventor: Guanghuo Guo, Shenzhen (CN)

(73) Assignee: Shenzhen Calion Power Co., Ltd, Shenzhen (CN)

( * ) Notice: Subject to any disclaimer, the term of this patent is extended or adjusted under 35 U.S.C. 154(b) by 4 days.

(21) Appl. No.: 17/846,079

(22) Filed: Jun. 22, 2022

(51) Int. Cl.
| | |
|---|---|
| *F21V 21/084* | (2006.01) |
| *F21V 21/08* | (2006.01) |
| *F21V 23/04* | (2006.01) |
| *F21V 7/04* | (2006.01) |
| *F21V 29/508* | (2015.01) |
| *F21V 14/06* | (2006.01) |
| *A42B 1/244* | (2021.01) |
| *F21Y 113/10* | (2016.01) |
| *F21Y 115/10* | (2016.01) |

(52) U.S. Cl.
CPC ............ *F21V 21/084* (2013.01); *A42B 1/244* (2013.01); *F21V 7/04* (2013.01); *F21V 14/065* (2013.01); *F21V 21/0816* (2013.01); *F21V 23/04* (2013.01); *F21V 29/508* (2015.01); *F21V 23/0471* (2013.01); *F21Y 2113/10* (2016.08); *F21Y 2115/10* (2016.08)

(58) Field of Classification Search
CPC ................................. A42B 1/242; A42B 1/244
See application file for complete search history.

(56) References Cited

U.S. PATENT DOCUMENTS

| | | | | |
|---|---|---|---|---|
| 2018/0224674 | A1* | 8/2018 | Carabin | G02C 11/10 |
| 2019/0350291 | A1* | 11/2019 | Maldonado | F21V 21/084 |
| 2020/0037685 | A1* | 2/2020 | Graham | A41D 1/002 |
| 2021/0310641 | A1* | 10/2021 | Grider | F21L 4/085 |
| 2022/0061444 | A1* | 3/2022 | Gibson | F21V 21/084 |

FOREIGN PATENT DOCUMENTS

| | | | | |
|---|---|---|---|---|
| CN | 204070712 U | | 1/2015 | |
| CN | 205695926 U | | 11/2016 | |
| CN | 109519750 A | * | 3/2019 | |
| CN | 211961066 U | | 11/2020 | |
| JP | 2004103361 A | * | 4/2004 | F21V 14/06 |

* cited by examiner

*Primary Examiner* — Alan B Cariaso
(74) *Attorney, Agent, or Firm* — Nitin Kaushik

(57) ABSTRACT

The present disclosure discloses an intelligent wearing device with LED lamps and relates to the technical field of outdoor wearing. The intelligent wearing device includes a knitted hat body, a fixed leather ring and a main housing, wherein a heat radiation plate is transversely fixed inside the main housing, an aluminum substrate is fixed to the obverse side of the heat radiation plate, white-light LED lamps are fixed to middle positions of the obverse side of the aluminum substrate, and an intelligent electrical control system and a lamplight adjusting apparatus are mounted in the main housing. According to the present disclosure, the irradiation range of lamplight may be adjusted by a lamplight focal length adjusting mechanism, so that the irradiation effect is effectivelyimproved; and the irradiation height of the lamplight may be adjusted by a lamplight height adjusting mechanism.

10 Claims, 19 Drawing Sheets

INTELLIGENT WEARING DEVICE WITH LED LAMPS

TECHNICAL FIELD

The present disclosure belongs to the technical field of outdoor wearing, in particular relates to an intelligent wearing device with LED lamps.

BACKGROUND

A knitted hat is a lightweight and practical product popular with the young and is a necessary product in cold winter so as to be a very popular product, An outdoor hat of an LED lamp apparatus is a combination of the knitted hat and an LED lamp module. Running exercise at night is relatively dangerous under the condition that no street lamps are provided, the knitted hat product is integrated with functions of LED lighting and SOS warning to improve the safety during outdoor sports and walks.

A multifunctional LED headlamp of a hat as shown in the application number 201610613756,2 includes a hat brim and a lighting apparatus which are disposed on the hat, the hat brim and the lighting apparatus are buckled by a nylon velvet tape disposed on the hat brim and a nylon hook tape disposed on the lighting apparatus, the lighting apparatus is provided with a solar cell panel and an LED lamp, and a control apparatus is disposed in the lighting apparatus. In the present disclosure, the hat brim and the lighting apparatus are buckled together by Velcro, so that the lighting apparatus is fixed to the greater extent, convenience is brought during operation. Power required by the LED lamp is supplied by the solar cell panel, so that not only are high efficiency and high speed achieved, but also energy conservation and environmental protection are achieved. Lighting modes having functions such as focus searchlighting, diffuse reflection of soft light and flickering for seeking help may be freely adjusted by the control apparatus, and therefore, it is very practical.

However, an existing apparatus is poorer in waterproof effect and is easily damaged under the influence of rainwater during use so as to be shorter in service life. The LED lamp module of the existing apparatus is fixed to the knitted hat and may not be detached, which is not beneficial to the cleaning of the knitted hat. The existing apparatus is incapable of controlling the irradiation height to easily blind personnel in an opposite direction, thereby causing a danger. The existing apparatus does not have a gesture control function so as to be poorer in practicability, Therefore, it is necessary to provide a novel solution for the above-mentioned problems.

SUMMARY

The purpose of the present disclosure is to provide an intelligent wearing device with LED lamps to solve existing problems that an existing apparatus is poorer in waterproof effect and does not have lamplight adjusting and warning functions and a gesture control function, an LED lamp module may not be detached, the irradiation range and the irradiation distance may not he adjusted, and the irradiation height may not be controlled.

In order to solve the above-mentioned problems, the present disclosure is implemented by adopting the following technical solutions.

An intelligent wearing device with LED lamps, comprising a knitted hat body (1), a fixed leather ring (2) and a main housing (5), wherein the fixed leather ring (2 ) is inlaid to the obverse side of the knitted hat body (1), the main housing (5) is detachably mounted inside the fixed leather ring (2), and a self-tightening spring (8) is mounted inside the fixed leather ring (2); a heat radiation plate (16) is transversely fixed inside the main housing (5), an aluminum substrate (32) is fixed to the obverse side of the heat radiation plate (16), white-light LED lamps (30) are fixed to middle positions of the obverse side of the aluminum substrate (32), and red-blue LED lamps (1) are symmetrically fixed to the obverse side of the aluminum substrate (32) and are located on two sides of the white-light LED lamps (30); an intelligent electrical control system and a lamplight adjusting apparatus are mounted in the main housing (5), and the lamplight adjusting apparatus comprises a lamplight height adjusting mechanism and a lamplight focal length adjusting mechanism.

Further, wherein the intelligent electrical control system comprises an SOS control switch (3), a lamplight control switch (4) and an infrared sensor (26); the SOS control switch (3) and the lamplight control switch (4) are mounted on one side of the surface of the main housing (5), and the SOS control switch (3) is located above the lamplight control switch (4); the infrared sensor (26) is located below the red-blue LED lamps (18) and is fixed to the obverse side of the aluminum substrate (32); a controller (31) is fixed inside the back of the heat radiation plate (16), and a high-capacity lithium battery (9) is fixed to the back of the heat radiation plate (16); and a charging port (27) is mounted in the other side of the main housing (5).

Further, wherein the SOS control switch (3), the lamplight control switch (4), the charging port (27), the infrared sensor (26), the white-light LED lamps (30) and the red-blue LED lamps (18) are all electrically connected with the controller (31).

Further, wherein the lamplight focal length adjusting mechanism comprises a reflecting bowl (29 and an optical lens (21), the reflecting howl (29) is fixed to the obverse side of the aluminum substrate (32), the white-light LED lamps (30) are located inside the reflecting bowl (29), the surface of the reflecting bowl (29) is rotatably connected with a gear (22) via a screw thread, and the optical lens (21) is fixed to the top of the gear (22).

Further, wherein the lamplight focal length adjusting mechanism further comprises a supporting plate (19), a rack (20) and two push-pull rods (7); the supporting plate (19) is fixed to the bottom of the inner wall of the main housing (5); a sliding rail (33) is fixed to the bottom of the rack (20), the rack (20) is slidably connected to the inside of the supporting plate (19) via the sliding rail (33), and the rack (20) is meshed and connected with the gear (22); and one end of each of the push-pull rods (7) is symmetrically fixed to two ends of the rack (20), the other ends of the push-pull rods (7) are located on two sides of the main housing (5), and both of the push-pull rods (7)are slidably connected with the main housing (5).

Further, wherein the lamplight height adjusting mechanism comprises a driving assembly and a light shielding assembly; the driving. assembly comprises a worm rod (10), an inner housing (25) and a knob (17); the inner housing (25) is fixed to the top of the inner wall of the main housing (5); the worm rod (10) is located inside the inner housing (25), one end of the worm rod (10) is rotatably connected with the bottom of the inner wall of the inner housing (25), and the other end of the worm rod (10) is rotatably connected with the main housing (5); and the knob (17) is located on the top of the surface of the main housing (5) and is fixedly connected with the other end of the worm rod (10).

Further, wherein the driving assembly further comprises a worm gear (11), a transmission rod (12) and a pressing plate (13), the transmission rod (12) is rotatably connected to the inside of the inner housing (25), the worm gear (11) and the pressing plate (13) are sequentially fixed to the surface of the transmission rod (12), the worm gear (11) is located inside the inner housing (25), and the pressing plate (13) is located on the obverse side of the inner housing (25).

Further, wherein the light shielding assembly comprises a fixed rod (15) and a light shielding plate (14), two ends of the fixed rod (15) are fixed to the inner wall of the main housing (5), the fixed rod (15) is located below the inner housing (25), the surface of the fixed rod (15) is rotatably connected with the light shielding plate (14), limiting rings (23) are fixed to the surface of the fixed rod (15) and are located two sides of the light shielding plate (14), torsional springs (24) are mounted on the surface of the fixed rod (15) and are located between each limiting ring (23) and the light shielding plate (14), one end of each torsional spring (24) is fixedly connected with the light shielding plate (14), and the other ends of the torsional springs (24) are fixedly connected with the limited rings (23).

Further, wherein a hoop (34) is fixed to the obverse side of the main housing (5), and a lens (6) is fixed inside the hoop (34).

Further, wherein a detachable waterproof rubber stopper (28) is mounted on position, corresponding to the charging port (27), on the other side of the main housing (5), a sealing ring is mounted between each push-pull rod (7) and the main housing (5), a sealing ring is mounted between the worm rod (10) and the main housing (5), and the surfaces of both of the SOS control switch (3) and the lamplight control switch (4) are covered with waterproof rubber jackets.

Compared with the prior art, the present disclosure has the beneficial effects;

(1) by adopting the waterproof rubber stopper, the sealing ring and the waterproof rubber jackets, the waterproofness of the device may be effectively improved, and the service life of the device may be prolonged;

(2) by adopting the annular bulge and the annular groove, the main housing may be detachably clamped inside the fixed leather ring to facilitate washing the knitted hat body, and thus, electronic functions inside the main housing are not affected; a radial force of the annular bulge pressing against the annular groove is increased by the self-tightening spring, by which the main housing is not easy to fall from the inside of the fixed leather ring, so that the use stability of the product is greatly improved;

(3) by adopting the lamplight focal length adjusting mechanism, the irradiation range of lamplight may be adjusted, so that the irradiation effect is effectively improved;

(4) by adopting the lamplight focal length adjusting mechanism, the irradiation height of lamplight may be adjusted to avoid direct irradiation of rays to human eyes and avoid blinding personnel in an opposite direction, thereby reducing traffic accidents;

(5) by repeatedly pressing the lamplight control switch, the brightness and on/off of the lamplight may he controlled; the SOS control switch is pressed to remind a driver of a vehicle of avoiding the flicker during outdoor sports, so that the effect of protecting the personal safely of a product user is achieved, long-distance recognition may he further achieved, and then, the practicability and safety of the product are greatly improved; and (6) by adopting the infrared sensor, a gesture may be induced, then, the function of controlling a controller switch by means of the gesture is achieved, and thus, the practicability of the product is further improved.

DETAILED DESCRIPTION OF THE EMBODIMENTS

Figure 1:
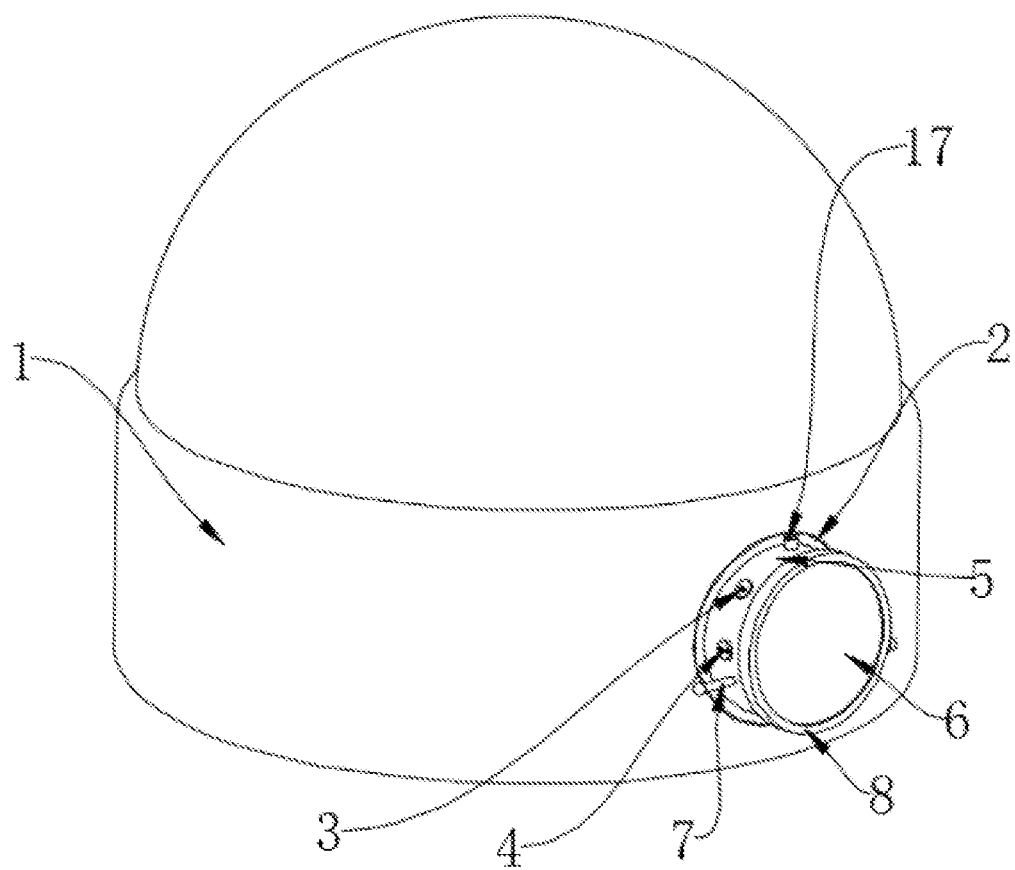
FIG. 1 shows a schematic view of an overall structure in the present disclosure.
Figure 2:
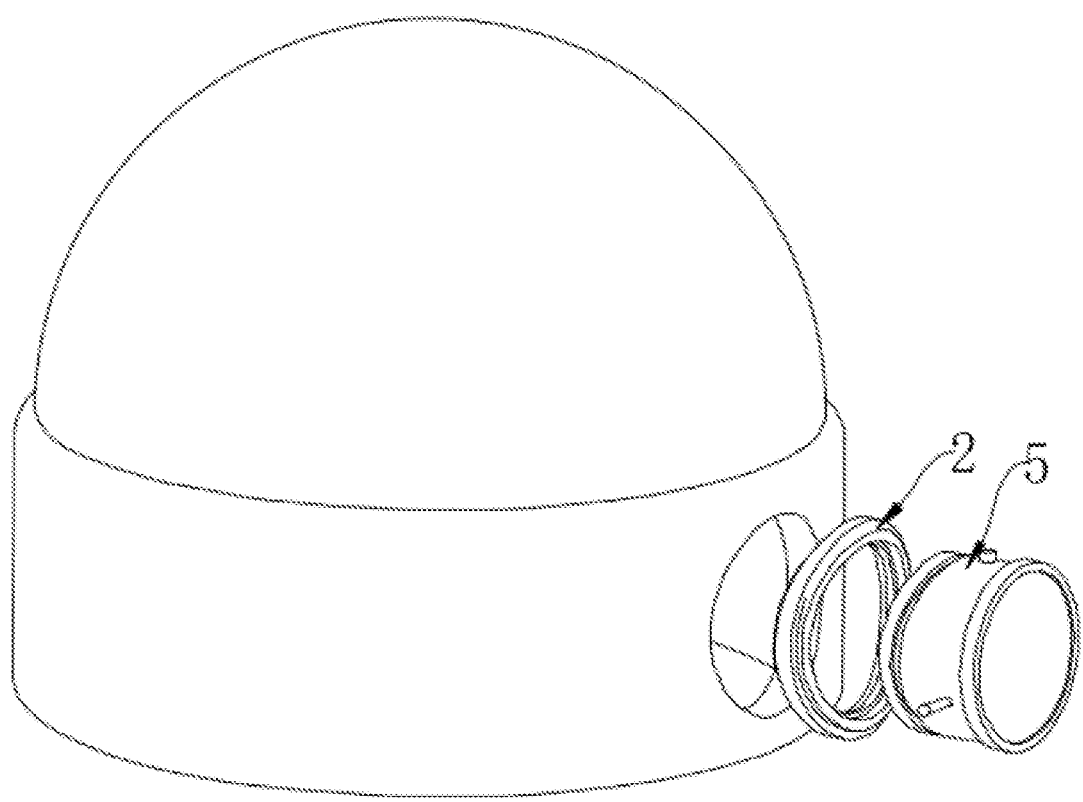
FIG. 2 shows a schematic view of a connecting structure for overall assembly in the present disclosure.
Figure 3:
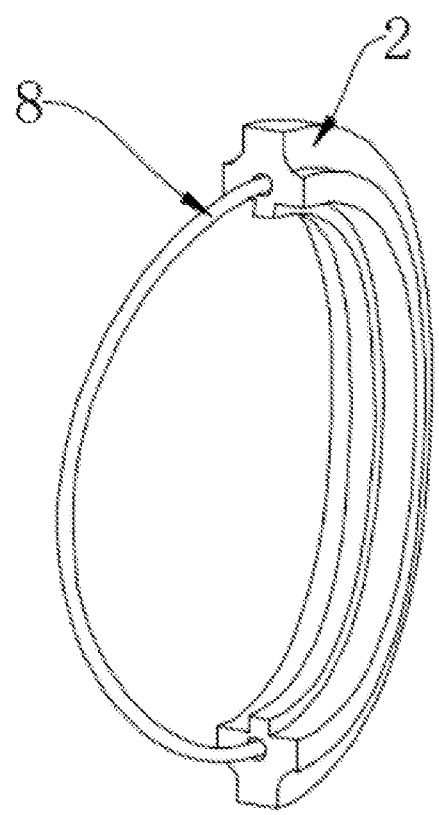
FIG. 3 shows a schematic view of a connecting structure of a self-tightening spring in the present disclosure.

With reference to FIGS. 1 to 9, the present discloses an intelligent wearing device with LED lamps.

Specifically, with reference to FIGS. 1 to 6, the intelligent wearing, device includes a knitted hat body 1, a fixed leather ring 2 and a main housing 5, wherein the fixed leather ring 2 is inlaid to the obverse side of the knitted hat body 1 by sewing, and the fixed leather ring 2 is made of silica gel TPE; the main housing 5 is detachably mounted inside the fixed leather ring 2, an annular bulge is disposed on the inner wall of the fixed leather ring 2, an annular groove is formed in a position, corresponding to the annular bulge, on the surface of the main housing 5, and the main housing 5 is detachably clamped inside the fixed leather ring 2 by the annular bulge and the annular groove to facilitate washing the knitted hat body 1, and thus, the electronic functions inside the main housing 5 are not affected; a self-tightening spring is mounted inside the fixed leather ring 2, the self-tightening spring 8 is used for increasing a radial force of the annular bulge pressing against the annular groove, and during use, by using the self-tightening spring 8, the main housing 5 is not easy to fall from the inside of the fixed leather ring 2, so that the use stability of the product is greatly improved.

A heat radiation plate is transversely fixed inside the main housing 5; an aluminum substrate 32 is fixed to the obverse side of the heat radiation plate 16; white-light LED lamps 30 are fixed to middle positions of the obverse side of the aluminum substrate, 32, and the rated power of the white-light LED lamps 30 is 1.2 W; red-blue LED lamps 18 are symmetrically fixed to the obverse side of the aluminum substrate 32 and are located on two sides of the white-light LED lamps 30; the white-light LED lamps 30 and the red-blue LED lamps 18 are welded to be fixed on the surface of the aluminum substrate 32; the aluminum substrate 32 is used for conducting heat generated by the white-light LED lamps 30 and the red-blue LED lamps 18 in working processes to ensure that the white-light LED lamps 30 and the red-blue LED lamps 18 may normally and stably work; the beat radiation plate 16 and the main housing 5 are made of aluminum alloy which has the characteristics of good heat conduction effect and light weight; and the heat radiation plate 16 is used for transferring heat from the aluminum substrate 32 to the main housing 5, thereby increasing the heat radiation area and transferring the heat to the air by the main housing 5.

An intelligent electrical control system and a lamplight adjusting apparatus are mounted in the main housing 5, and the lamplight adjusting apparatus includes a lamplight height adjusting mechanism and a lamplight focal length adjusting mechanism.

The intelligent electrical control system is used for adjusting the brightness of the white-light LED lamps 30 and controlling the on or off of the white-light LED lamps 30 and the red-blue LED lamps 18. The intelligent electrical control system specifically includes an SOS control switch 3, a lamplight control switch 4 and an infrared sensor 26; the SOS control switch 3 and the lamplight control switch 4 are mounted on one side of the surface of the main housing 5, and the SOS control switch 3 is located above the lamplight control switch 4; the infrared sensor 26 is located below the red-blue LED lamps 18 and is fixed to the obverse side of the aluminum substrate 32; a controller 31 is fixed inside the back of the heat radiation plate 16, and a high-capacity lithium battery 9 is fixed to the back of the heat radiation plate 16; a charging port 27 is mounted in the other side of the main housing 5; and the SOS control switch 3, the lamplight control switch 4, the charging port 27, the infrared sensor 26, the white-light LED lamps 30 and the red-blue LED lamps 18 are all electrically connected with the controller 31.

During use, by pressing the lamplight control switch 4 once, the lamplight control switch 4 transfers a signal to the controller 31, the controller 31 controls the white-light LED lamps 30 to be powered on at the power of 0.6 W. When the lamplight control switch 4 is pressed again, the lamplight control switch 4 transfers the signal to the controller 31, and the controller 31 controls the white-light LED lamps 30 to be powered on at the power of 1.2 W. When the lamplight control switch 4 is pressed for the third time, the lamplight control switch 4 transfers the signal to the controller 31 and the controller 31 controls the white-light LED lamps 30 to be powered off. By pressing the lamplight control switch 4 according to such circulation, the brightness of the white-light LED lamps 30 and on/off the white-light LED lamps 30 may be controlled.

During use, by pressing the lamplight control switch 4 for a long time, the lamplight control switch 4 transfers a signal to the controller 31, the controller 31 controls the infrared sensor 26 to be powered on. When it is detected by the infrared sensor 26 that there is a gesture for shielding in the front, the infrared sensor 26 transfers the signal to the controller 31, and the controller 31 controls the white-light LED lamps 30 to be powered off. When the infrared sensor 26 is shielded for the second time, the infrared sensor 26 transfers the signal to the controller 31, and the controller 31 controls the white-light LED lamps 30 to be powered on, and thus, the function of controlling the on/off of the controller 31 by means of the gesture is achieved.

During use, by pressing the SOS control switch 3, the SOS control switch 3 transfers a signal to the controller 31, the controller 31 controls red lamps and blue lamps of the red-blue LED lamps 18 to flicker alternately to remind a driver of a vehicle of avoiding the flicker during outdoor sports, so that the effect of protecting the personal safety of a product user is achieved, and long-distance recognition may be further achieved.

With reference to FIGS. 2 to 7, in an embodiment, the lamplight focal length adjusting mechanism is used for adjusting a lighting angle and specifically includes a reflecting bowl 29 and an optical lens 21, the reflecting bowl 29 is fixed to the obverse side of the aluminum substrate 32, the white-light LED lamps 30 are located inside the reflecting bowl 29, the reflecting bowl 29 is used for refracting scattered rays generated by the white-light LED lamps 30, the surface of the reflecting bowl 29 is rotatably connected with a gear 22 via a screw thread, the optical lens 21 is fixed to the top of the gear 22, and the optical lens 21 is used for further refracting the rays.

The lamplight focal length adjusting mechanism further includes a supporting plate 19, a rack 20 and two push-pull rods 7; the supporting plate 19 is fixed to the bottom of the inner wall of the main housing 5; a sliding rail 33 is fixed to the bottom of the rack 20, the rack 20 is slidably connected to the inside of the supporting plate 19 via the sliding rail 33, the supporting plate 19 is used for limiting and supporting the rack 20 to improve the stability of the rack 20 during operation, and the rack 20 is meshed and connected with the gear 22; and one end of each of the push-pull rods 7 is symmetrically fixed to two ends of the rack 20, the other ends of the push-pull rods 7 are located on two sides of the main housing 5, and both of the push-pull rods 7 are slidably connected with the main housing 5. During use, the push-pull rods 7 on two sides of the main housing 5 are pressed or pushed to drive the rack 20 to move left and fight, thereby driving the gear 22 to rotate; due to the interaction of the screw thread between the gear 22 and the reflecting bowl 29, the gear 22 drives the optical lens 21 to move to a direction close to the white-light LED lamps 30 during rotation, after a ray is refracted by the optical lens 21, the irradiation angle is increased, and thus, the irradiation range is widened; the gear 22 drives the optical lens 21 to move to a direction away from the white-light LED lamps 30, and after the ray is refracted by the optical lens 21, the irradiation angle is reduced, so that the irradiation distance is increased; and the thickness of the gear 22 is greater than the movement stroke of the optical lens 21, so that the gear 22 may not be separated from the reflecting bowl 29 and the rack 20 during movement.

Figure 4:
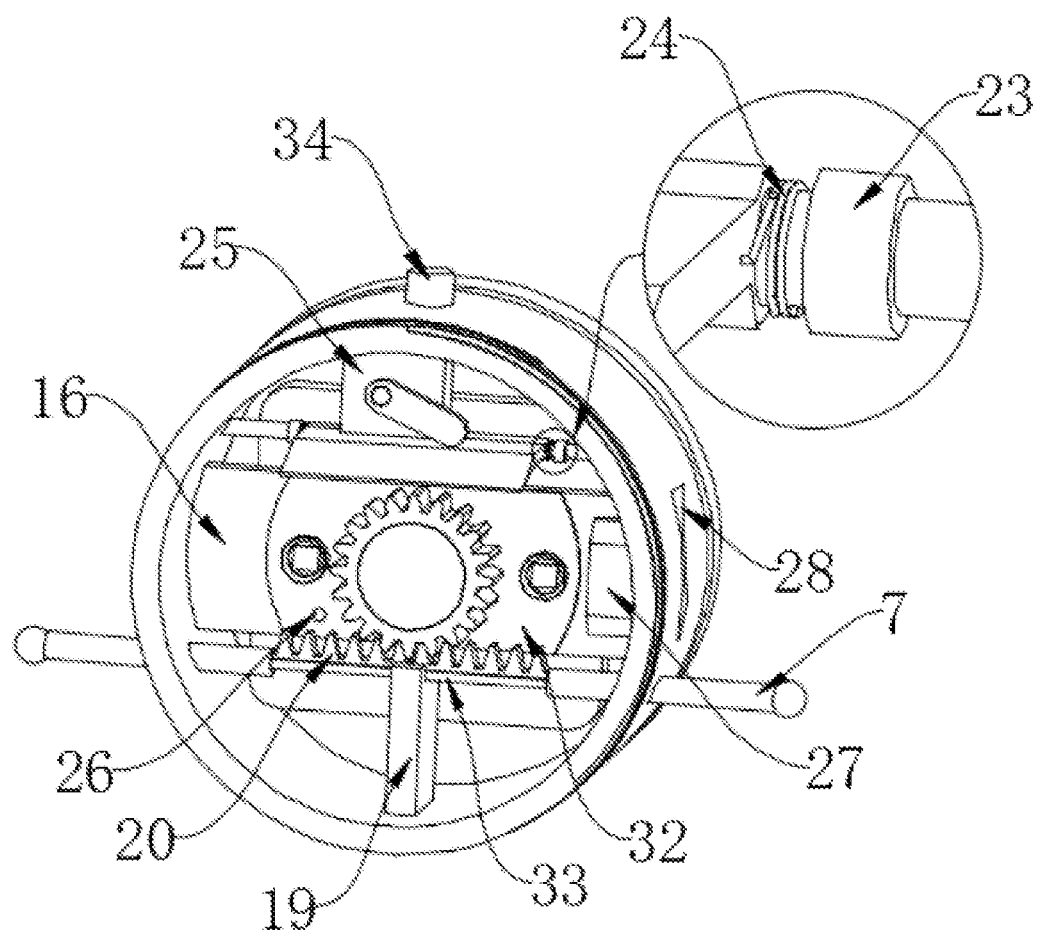
FIG. 4 shows a schematic view of a connecting structure inside a main housing and on the positions of torsional springs in the present disclosure.
Figure 5:
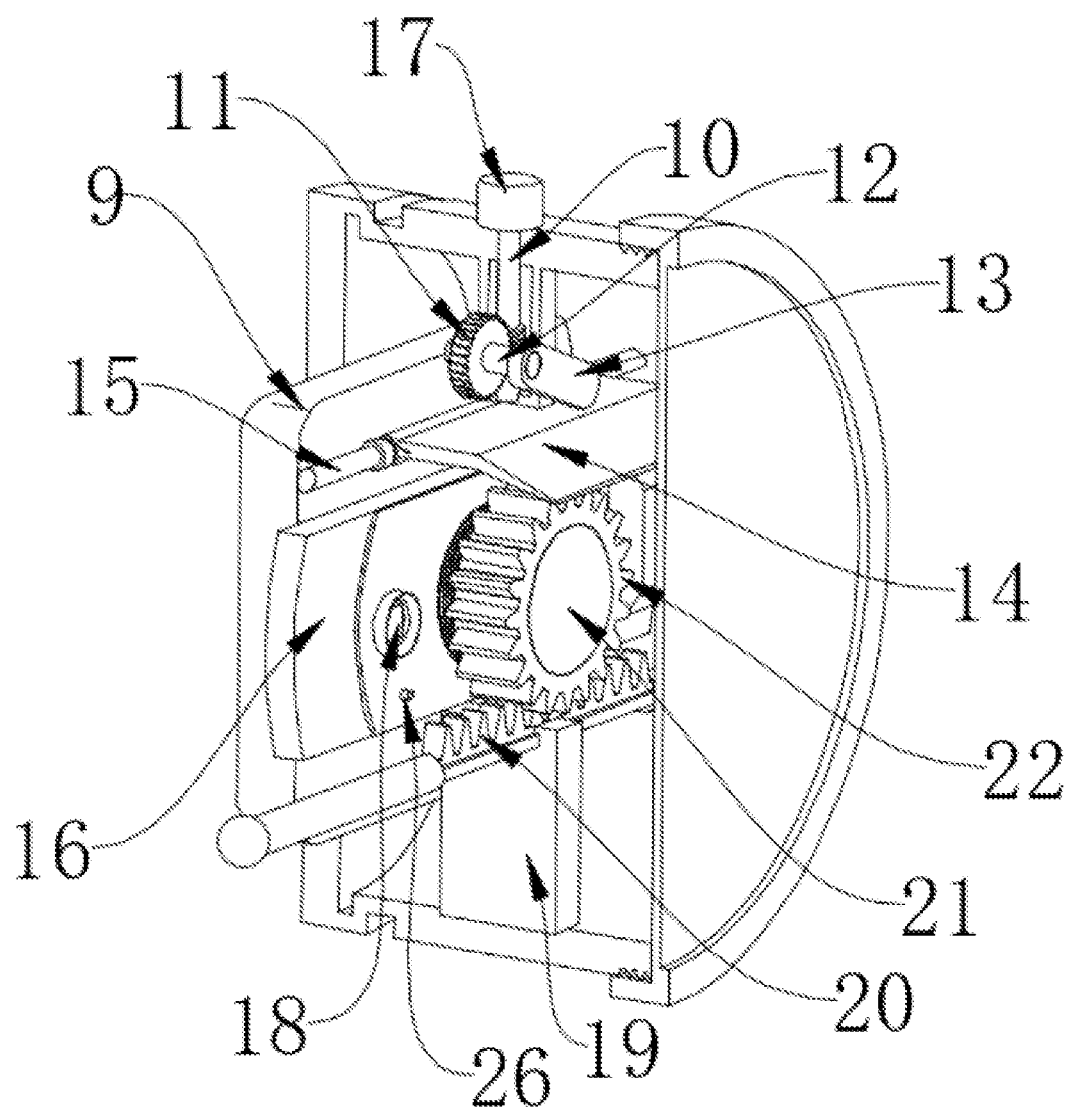
FIG. 5 shows a schematic sectional view of a connecting structure in the main housing in the present disclosure.
Figure 6:
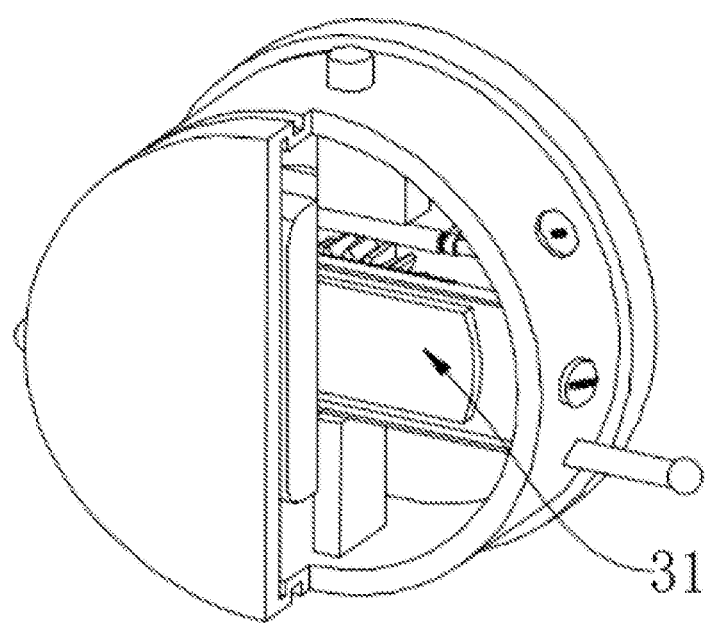
FIG. 6 shows a schematic view of a connecting structure on the position of a controller in the present disclosure.
Figure 7:
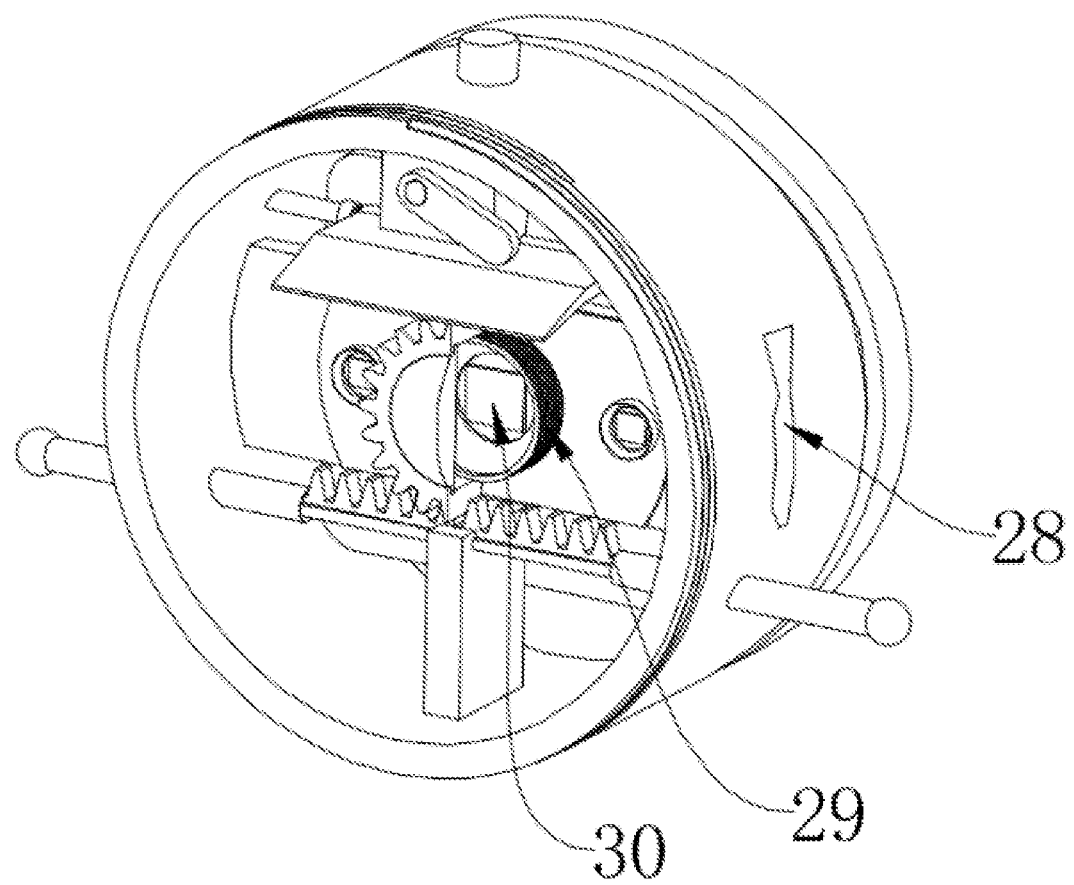
FIG. 7 shows a schematic view of a connecting structure inside a gear in the present disclosure.
Figure 8:
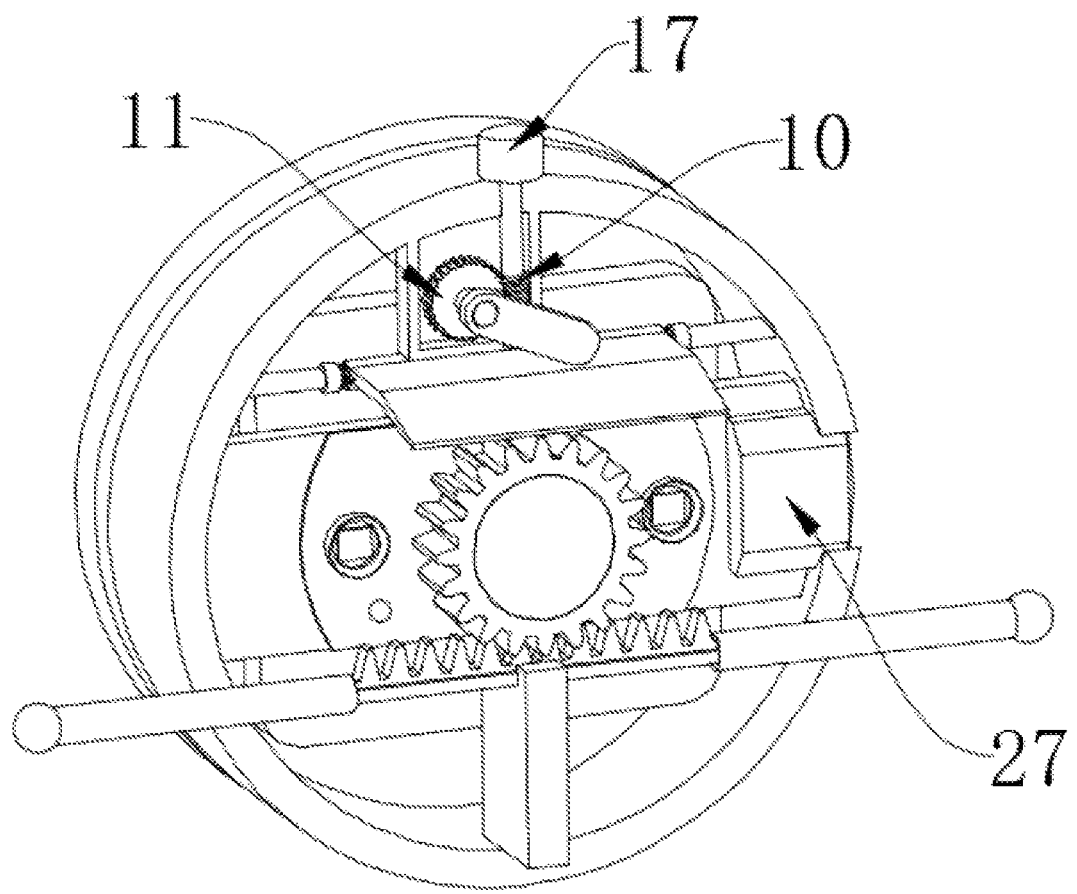
FIG. 8 shows a schematic view of a connecting structure inside an inner housing in the present disclosure.

With reference to FIG. 4, FIG. 5 and FIG. 8, in an embodiment, the lamplight height adjusting mechanism is used for adjusting the irradiation height of lamplight and specifically includes a driving assembly and a light shielding assembly. The driving assembly includes a worm rod 10, an inner housing 23 and a knob 17; the inner housing 25 is fixed to the top of the inner wall of the main housing 5; the worm rod 10 is located inside the inner housing 25, one end of the worm rod 10 is rotatably connected with the bottom of the inner wall of the inner housing 25, and the other end of the worm rod 10 is rotatably connected with the main housing 5; and the knob 17 is located on the top of the surface of the main housing 5 and is fixedly connected with the other end of the worm rod 10. The driving assembly further includes a worm gear 11, a transmission rod 12 and a pressing plate 13, the transmission rod 12 is rotatably connected to the inside of the inner housing 25, the worm gear 11 and the pressing plate 13 are sequentially fixed to the surface of the transmission rod 12, the worm gear 11 is located inside the inner housing 25, and the pressing plate 13 is located on the obverse side of the inner housing 25.

It may be known from the above-mentioned structural design that the knob 17 is twisted to drive the worm rod 10 to rotate, the worm rod 10 drives the worm gar 11 to rotate, then, the worm gear 11 drives the transmission rod 12 to rotate, and the transmission rod 12 drives the pressing plate 13 to rotate.

Figure 9:
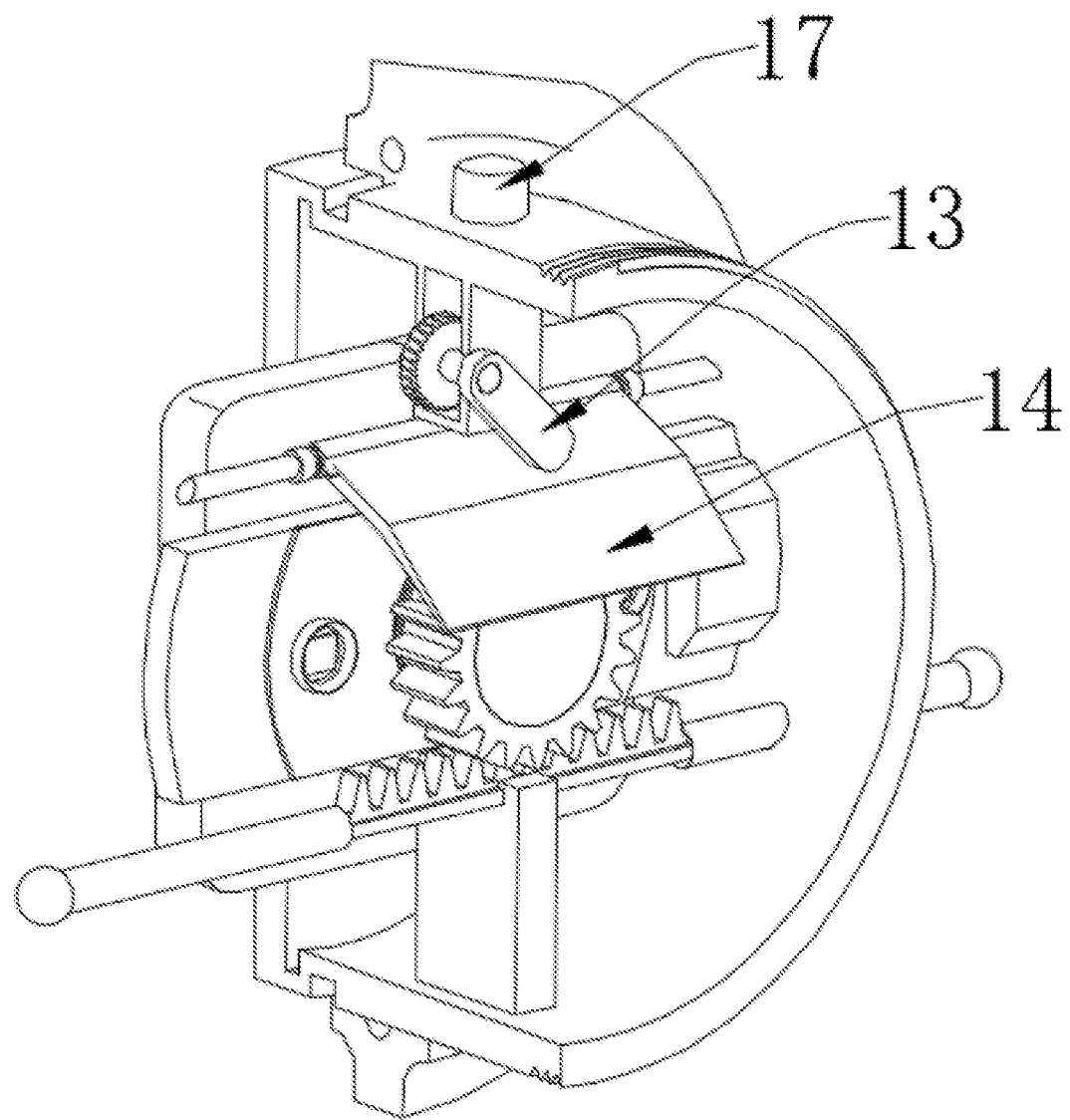
FIG. 9 shows a schematic view of a connecting structure when light is shielded by a light shielding plate in the present disclosure.

The light shielding assembly includes a fixed rod 15 and a light shielding plate 14, two ends of the fixed rod 15 are fixed to the inner wall of the main housing 5, the fixed rod 15 is located below the inner housing 25, the surface of the fixed rod 15 is rotatably connected with the light shielding plate 14, limiting rings 23 are fixed to the surface of the fixed rod 15 and are located two sides of the light shielding plate 14, torsional springs 24 are mounted on the surface of the fixed rod 15 and are located between each limiting ring 23 and the light shielding plate 14, the limiting rings 23 are used for limiting the torsional springs 24 and the light shielding plate 14, one end of each torsional spring 24 is fixedly connected with the tight shielding plate 14, the other ends of the torsional springs 24 are fixedly connected with the limiting rings 23, and the torsional springs 24 are used for supplying an upward rotation force to the light shielding plate 14. Therefore, when rotating downwards, the pressing plate 13 may drive the light shielding plate 14 to rotate downwards to shield rays on a high place, so that the irradiation height of the rays is adjusted to avoid direct irradiation of the rays to human eyes and avoid blinding personnel in an opposite direction, thereby reducing traffic accidents. As shown in FIG. 9, the light shielding plate 14 may overturn for an angle within a certain range with the fixed rod 15 as a rotating shaft, and thus, the optical lens 21 (part) is covered by the light shielding plate 14.

With reference to FIG. 1, in an embodiment, a hoop 34 is fixed to the obverse side of the main housing 5 and is used for fixing a lens 6, and the lens 6 is fixed inside the hoop 34, is made of a transparent acrylic material and is used for isolating an internal structure from the outside.

A detachable waterproff rubber stopper 28 is mounted on a position, corresponding to the charging port 27, on the other side of the main housing 5 and is used for preventing dust and rainwater from entering the main housing 5 via the charging port 27, a sealing ring is mounted between each push-pull rod 7 and the main housing 5, a sealing ring is mounted between the worm rod 10 and the main housing 5, and the surfaces of both of the SOS control switch 3 and the lamplight control switch 4 are covered with waterproof rubber jackets used to be filled in a gap between each of the SOS control switch 3 and the lamplight control switch 4 and the main housing 5 so as to prevent the rainwater and the dust from entering the main housing 5. The waterproof rubber stopper 28, the sealing rings and the waterproof rubber jackets are mainly used for improving the waterproofness of the device and prolonging the service life of the device.

Figure 10:
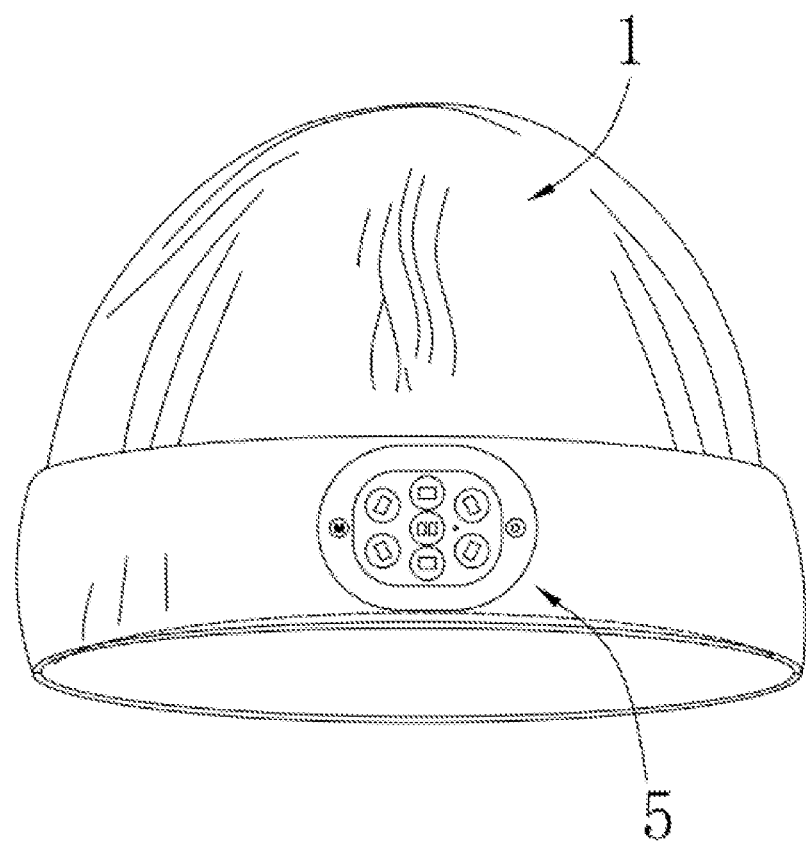
FIG. 10 shows a schematic view of another structure of a knitted hat body in the present. disclosure.

With reference to FIG. 10, in an embodiment, the main housing 5 and the knitted hat body 1 are mounted in a manner which is basically the same as that in FIG. 1. However, in FIG. 10, the main housing 5 is completely stored in the knitted hat body 1, that is, the outer end of the main housing 5 is flush with the outer rad of the knitted hat body 1.

Figure 11:
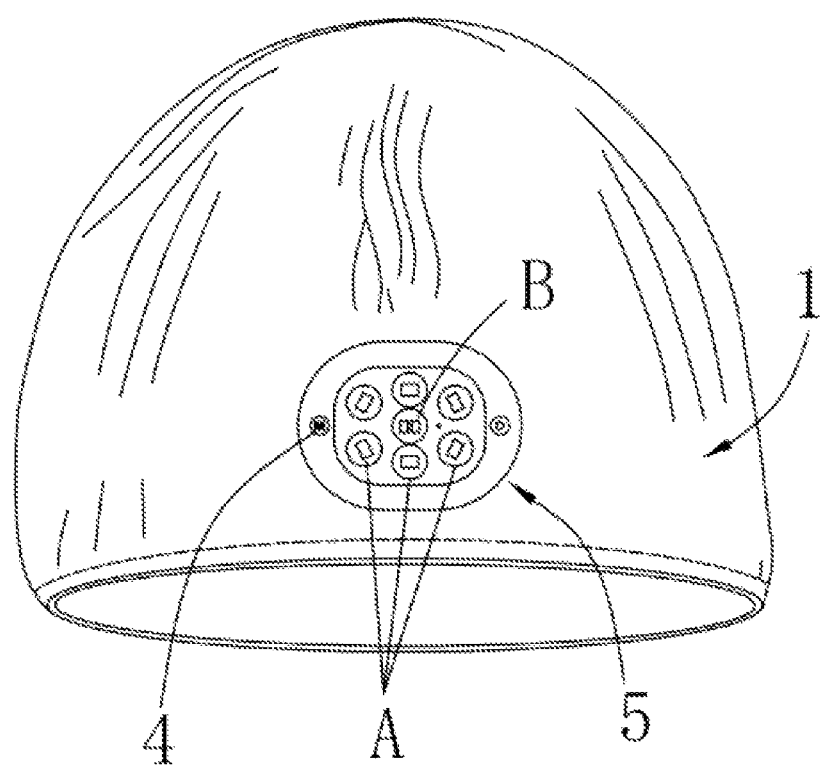
FIG. 11 shows a first schematic view of another structure of the knitted hat body in the present disclosure.

With reference to FIG. 11, in an embodiment, the shape of the knitted hat body 1 is slightly different from that in FIG. 10 or FIG. 1. Moreover, in FIG. 11, letter A represents positions of the six white-light LED lamps 30 at the periphery, letter B represents positions of the red-blue LED lamps 18, and the lamplight control switch 4 is mounted on the obverse side of the main housing 5 and is located outside the white-tight LED lamps 30 and the red-blue LED lamps 18.

Figure 12:
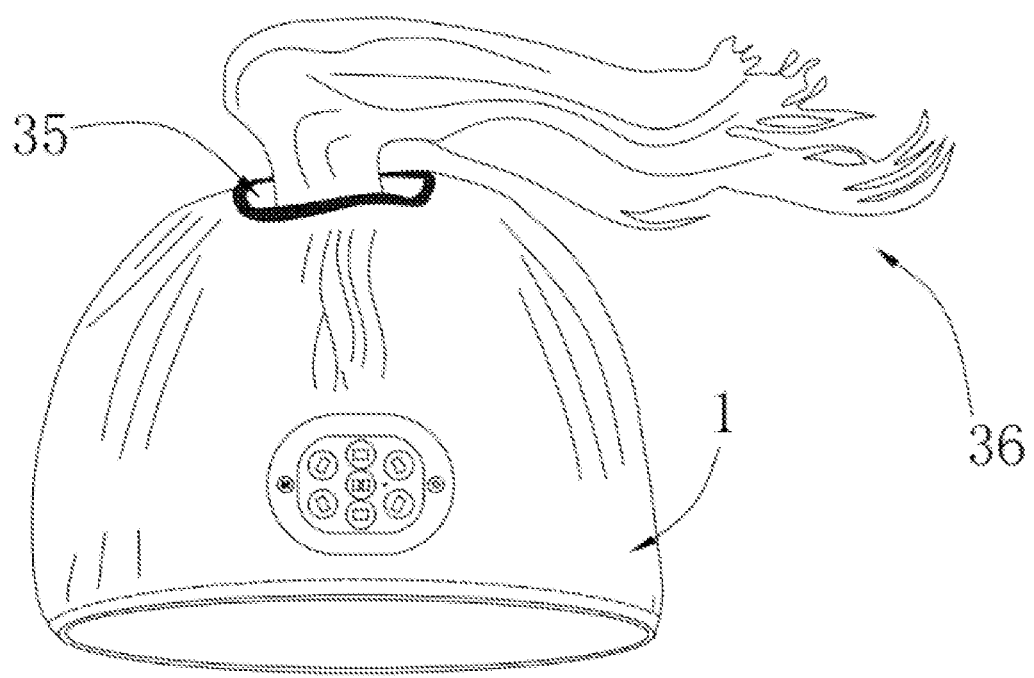
FIG. 12 shows a second schematic view of another structure of the knitted hat body in the present disclosure.

With reference to FIG. 12, in an embodiment, the shape of the knitted hat body 1 is slightly different from that in FIG. 11 in that a top opening 35 is reserved in the top of the knitted hat body 1, and then, a decorating part 36 is preset in the top opening 35.

Figure 13:
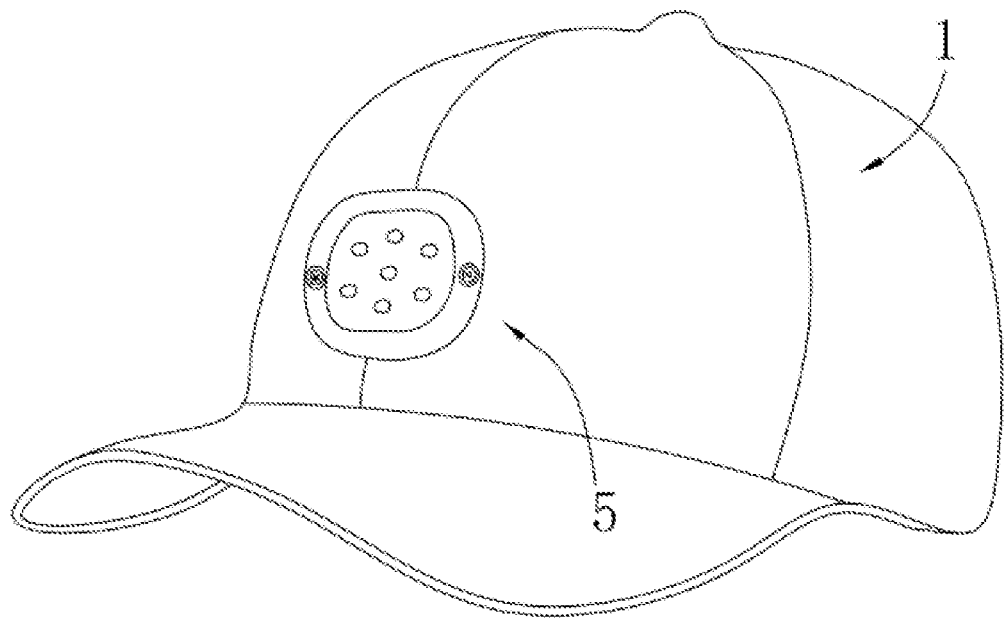
FIG. 13 shows a third schematic view of another structure of the knitted hat body in the present disclosure.

With reference to FIG. 13, in an embodiment, the shape of the knitted hat body 1 is slightly different from that in FIG. 1 or FIG. 11.

Figure 14:
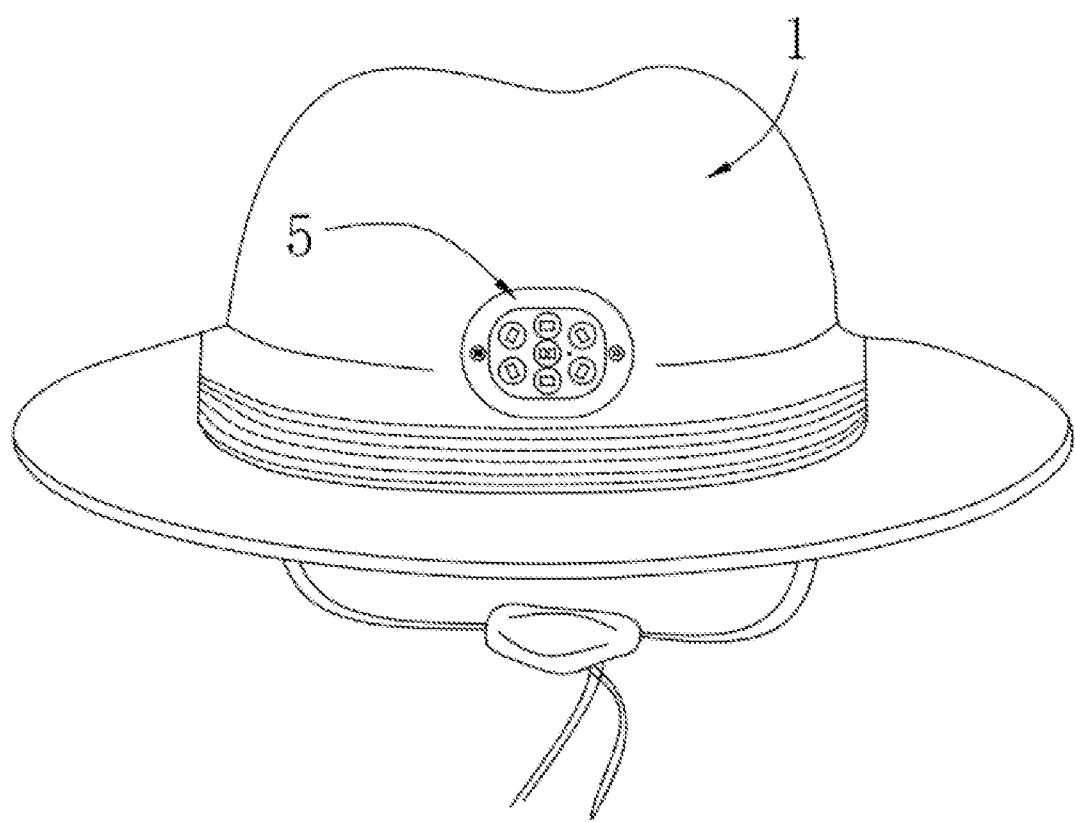
FIG. 14 shows a fourth schematic view of another structure of the knitted hat body in the present disclosure.

With reference to FIG. 14, in an embodiment, the shape of the knitted hat body 1 is slightly different from that in FIG. 1 or FIG. 12.

Figure 15:
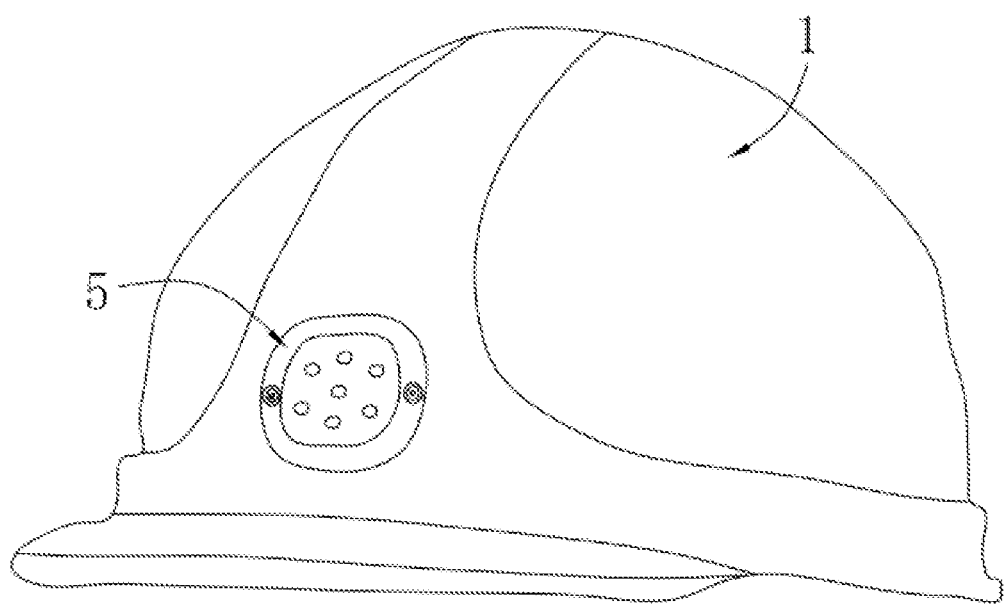
FIG. 15 shows a fifth schematic view of another structure of the knitted hat body in the present disclosure.

With reference to FIG. 15, in an embodiment, the shape of the knitted hat body 1 is slightly different from that in FIG. 1 or FIG. 13.

Figure 16:
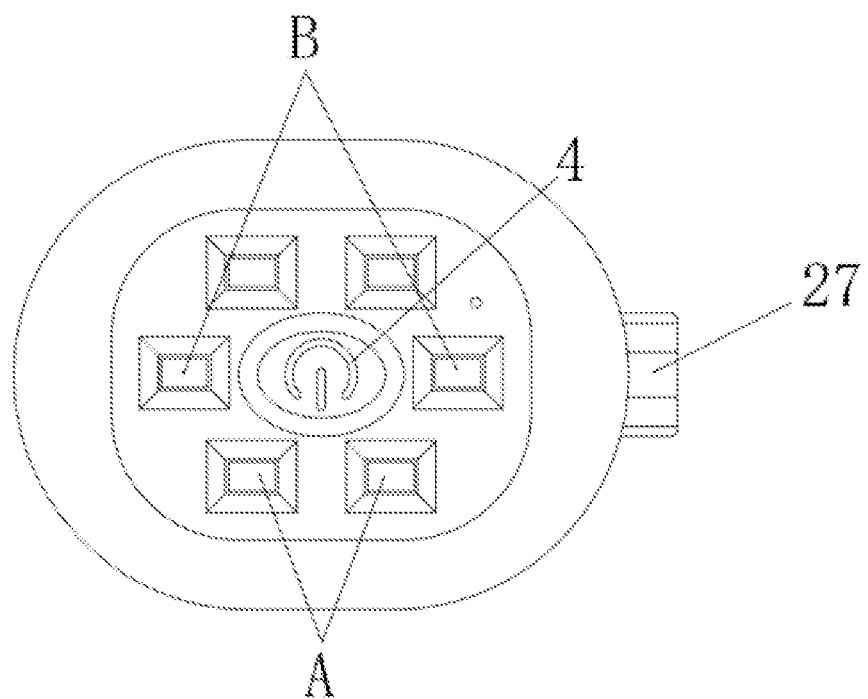
FIG. 16 shows a schematic view of another structure of the main housing in FIG. 11 in the present disclosure.

With reference to FIG. 16, in an embodiment, positions of the LED lamps and the lamplight control switch on the main housing 5 are slightly different from those in FIG. 11, the lamplight control switch 4 is mounted in the middle of the obverse side of the main housing 5 and is surrounded by the white light LED lamps 30 and the red-blue LED lamps 18.

Figure 17:
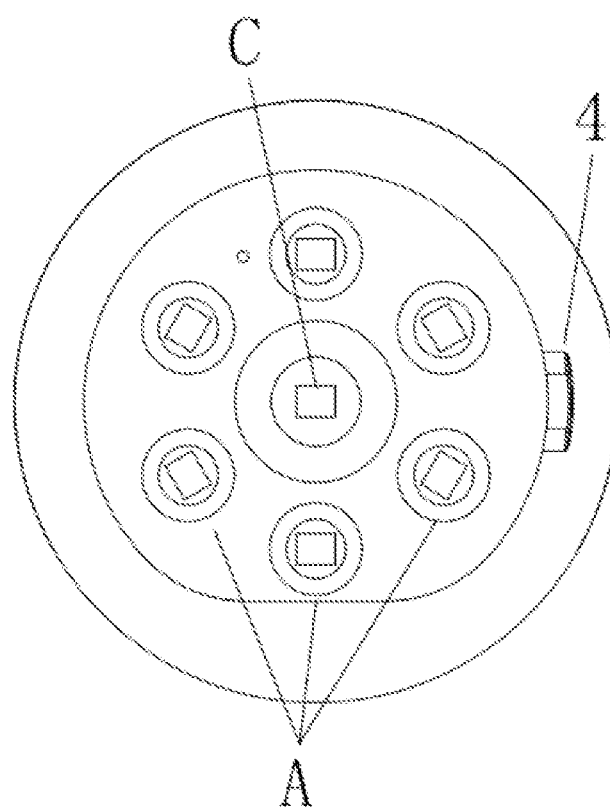
FIG. 17 shows a second schematic view of another structure of the main housing in FIG. 11 in the present disclosure.

With reference to FIG. 17, in an embodiment, positions of the LED lamps and the lamplight control switch on the main housing 5 are slightly different from those in FIG. 11 that the lamplight control switch 4 is mounted on the side of the main housing 5, and middle high-power white lamps, namely at the position where letter C is located, are added in the middles of the white-light LED lamps 30 in addition to the white-light LED lamps 30.

Figure 18:
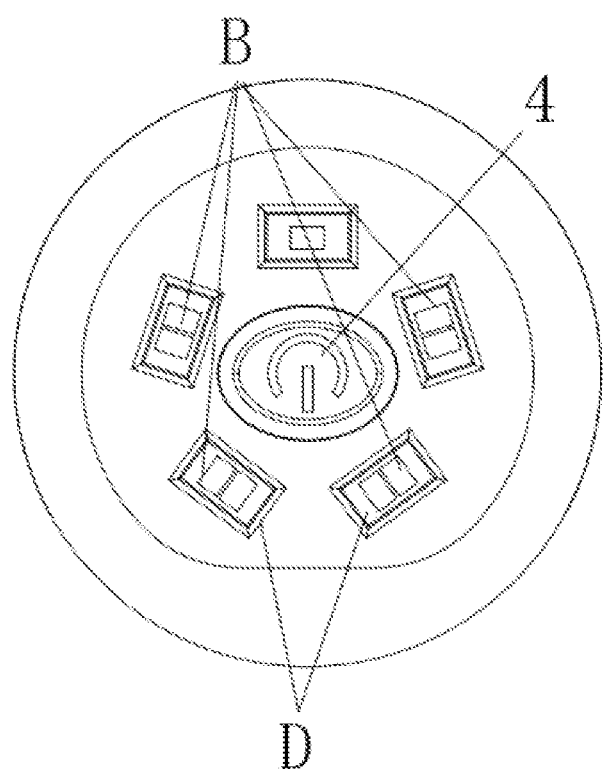
FIG. 18 shows a third schematic view of another structure of the main housing in FIG. 11 in the present disclosure.

With reference to FIG. 18, in an embodiment, letter D represents positions of five white-light LED lamps 30 at the periphery.

Figure 19:
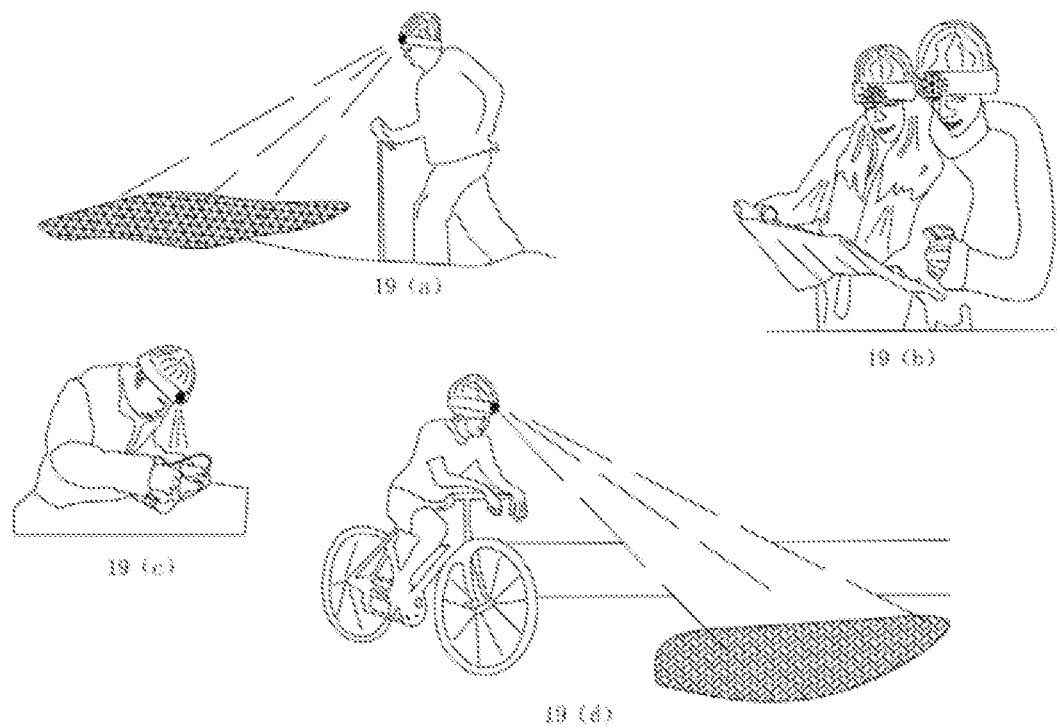
FIG. 19 shows a view of a use scene where the knitted hat body is worn in the present disclosure.

With reference to FIG. 19, in an embodiment, due to the addition of the LED lamps on the knitted hat body 1, the knitted hat body 1 worn in a dark environment is for the purpose of lighting; as shown in FIG. 19 (*a*) when the knitted hat body 1 is worn by the old, the old may clearly see the front pavement in an outdoor dark environment; as shown in FIG. 19 (*b*) to 19 (*c*), workers may clearly see construction drawings in a dark environment; and as shown in FIG. 19 (*d*), people may clearly see the front pavement at night or in a dark environment during outdoor sports.

What is claimed is:

1. An intelligent wearing device with LED lamps, comprising a knitted hat body (1), a fixed leather ring (2) and a main housing (5), wherein the fixed leather ring (2) is inlaid to the obverse side of the knitted hat body (1), the main housing (5) is detachably mounted inside the fixed leather ring (2), and a self-tightening spring (8) is mounted inside the fixed leather ring (2); a heat radiation plate (16) is transversely fixed inside the main housing (5), an aluminum substrate (32) is fixed to the obverse side of the heat radiation plate (16), white-light LED lamps (30) are fixed to middle positions of the obverse side of the aluminum substrate (32), and red-blue LED lamps (18) are symmetrically fixed to the obverse side of the aluminum substrate (32) and are located on two sides of the white-light LED lamps (30); an intelligent electrical control system and a lamplight adjusting apparatus are mounted in the main housing (5), and the lamplight adjusting apparatus comprises a lamplight height adjusting mechanism and a lamplight focal length adjusting mechanism.

2. The intelligent wearing device with LED lamps of claim 1 wherein the intelligent electrical control system comprises an SOS control switch (3), a lamplight control switch (4) and an infrared sensor (26); the SOS control switch (3) and the lamplight control switch (4) are mounted on one side of the surface of the main housing (5), and the SOS control switch (3) is located above the lamplight control switch (4); the infrared sensor (26) is located below the red-blue LED lamps (18) and is fixed to the obverse side of the aluminum substrate (32); a controller (31) is fixed inside of the back of the heat radiation plate (16), and a high-capacity lithium battery (9) is fixed to the back of the heat radiation plate (16); and a charging port (27) is mounted in the other side of the main housing (5).

3. The intelligent wearing device with LED lamps of claim 2, wherein the SOS control switch (3), the lamplight control switch (4), the charging port (27), the infrared sensor (26), the white-light LED lamps (30) and the red-blue LED lamps (18) are all electrically connected with the controller (31).

4. The intelligent wearing device with LED lamps of claim 3, wherein the lamplight focal length adjusting mechanism comprises a reflecting bowl (29) and an optical lens (21), the reflecting bowl (29) is fixed to the obverse side of the aluminum substrate (32), the white-light LED lamps (30) are located inside the reflecting bowl (29), the surface of the reflecting bowl (29) is rotatably connected with a gear (22) via a screw thread, and the optical lens (21) is fixed to the top of the gear (22).

5. The intelligent wearing device with LED lamps of claim 4, wherein the lamplight focal length adjusting mechanism further comprises a supporting plate (19), a rack (20) and two push-pull rods (7); the supporting plate (19) is fixed to the bottom of the inner wall of the main housing (5); a sliding rail (33) is fixed to the bottom of the rack (20), the rack (20) is slidably connected to the inside of the supporting plate (19) via the sliding rail (33), and the rack (20) is meshed and connected with the gear (22); and one end of each of the push-pull. rods (7) is symmetrically fixed to two ends of the rack (20), the other ends of the push-pull rods (7) are located on two sides of the main housing (5), and both of the push-pull rods (7) are slidably connected with the main housing (5).

6. The intelligent wearing device with LED lamps of claim 5, wherein the lamplight height adjusting mechanism comprises a driving assembly and a light shielding assembly; the driving assembly comprises a worm rod (10), an inner housing (25) and a knob (17); the inner housing (25) is fixed to the top of the inner wall of the main housing (5); the worm rod (10) is located inside the inner housing (25), one end of the worm rod (10) is rotatably connected with the bottom of the inner wall of the inner housing (25), and the other end of the worm rod (10) rotatably connected with the main housing (5); and the knob (17) is located on the top of the surface of the main housing (5) and is fixedly connected with the other end of the worm rod (10).

7. The intelligent wearing device with LED lamps of claim 6, wherein the driving assembly further comprises a worm gear (11), a transmission rod (12) and a pressing plate (13), the transmission rod (12) is rotatably connected to the inside of the inner housing (25), the worm gear (11) and the pressing plate (13) are sequentially fixed to the surface of the transmission rod (12), the worm gear (11) is located inside the inner housing (25), and the pressing plate (13) is located on the obverse side of the inner housing (25).

8. The intelligent wearing device with LED lamps of claim 7, wherein the light shielding assembly comprises a fixed rod (15) and a light shielding plate (14), two ends of the fixed rod (15) are fixed to the inner wall of the main housing (5), the fixed rod (15) is located below the inner housing (25), the surface of fixed rod (15) is rotatably connected with the light shielding plate (14), limiting rings (23) are fixed to the surface of the fixed rod (15) and are located two sides of the light shielding plate (14), torsional springs (24) are mounted on the surface of the fixed rod (15) and are located between each limiting ring (23) and the light shielding plate (14), one end of each torsional spring (24) is fixedly connected with the light shielding plate (14), and the other ends of the torsional springs (24) are fixedly connected with the limiting rings (23).

9. The intelligent wearing device with LED lamps of claim 8, wherein a hoop (34) is fixed to the obverse side of the main housing (5), and a lens (6) is fixed inside the hoop (34).

10. The intelligent wearing device with LED lamps of claim 9, wherein a detachable waterproof rubber stopper (28) is mounted on a position, corresponding to the charging port (27), the other side of the main housing (5), a sealing ring is mounted between each push-pull rod (7) and the main housing (5), a sealing ring is mounted between the worm rod (10) and the main housing (5), and the surfaces of both of the SOS control switch (3) and the lamplight control switch (4) are covered with waterproof rubber jackets.

* * * * *